(12) United States Patent
Laitala

(10) Patent No.: US 8,653,416 B2
(45) Date of Patent: Feb. 18, 2014

(54) ENGINE DRIVEN WELDER AND RUNNING GEAR

(75) Inventor: John P. Laitala, Appleton, WI (US)

(73) Assignee: Illinois Tool Works Inc., Glenview, IL (US)

(*) Notice: Subject to any disclaimer, the term of this patent is extended or adjusted under 35 U.S.C. 154(b) by 622 days.

(21) Appl. No.: 12/581,453

(22) Filed: Oct. 19, 2009

(65) Prior Publication Data

US 2010/0147816 A1    Jun. 17, 2010

Related U.S. Application Data

(60) Provisional application No. 61/122,996, filed on Dec. 16, 2008.

(51) Int. Cl.
*B23K 9/10* (2006.01)

(52) U.S. Cl.
USPC .......................................................... 219/133

(58) Field of Classification Search
USPC .......................................................... 219/133
See application file for complete search history.

(56) References Cited

U.S. PATENT DOCUMENTS

| 1,969,048 | A | 8/1934 | Smith |
| 2,385,514 | A | 9/1945 | Hawkins |
| 2,779,492 | A | 1/1957 | Lapham |
| 3,471,046 | A | 10/1960 | Hess |
| 3,108,179 | A | 10/1963 | Ulli |
| 3,237,051 | A | 2/1966 | Schober |
| 3,411,798 | A | 6/1966 | Capadalis |
| 3,460,850 | A | 8/1969 | Franklin |
| 3,596,048 | A | 7/1971 | Maeda |
| 3,682,342 | A | 8/1972 | Evans |
| 3,734,196 | A | 5/1973 | Mangum |
| 3,741,574 | A | 6/1973 | Burrow, Jr. |

(Continued)

FOREIGN PATENT DOCUMENTS

| DE | 8931598 | 10/1953 |
| DE | 1681239 U | 8/1954 |

(Continued)

OTHER PUBLICATIONS

Cover of Lincoln Instruction Manual No. IM-112 (published in 1955) and entitled: The Lincoln "Shield-Arc" The Welder with Self-Indicating Dual Continuous Control.

(Continued)

*Primary Examiner* — Hoai V Ho
*Assistant Examiner* — Min Huang
(74) *Attorney, Agent, or Firm* — Boyle Fredrickson, S.C.

(57) ABSTRACT

A portable engine driven welder is provided that has a case enclosing an internal combustion engine and a welding generator, and a running gear that is attached to the case. The running gear includes a pair of rails and a pair of leading wheels connected to the rails toward the back wall of the case. A pair of trailing wheels is connected to the rails toward the front wall of the case. The leading and trailing wheels have different resiliency values with the leading wheels being more resilient or flexible than the trailing wheels. This allows the leading wheels to act like a suspension system for the portable engine driven welder and running gear by soaking up or absorbing impacts instead of transmitting them therethrough so as to reduce exposure of the portable engine driven welder to such impacts.

10 Claims, 3 Drawing Sheets

(56) References Cited

U.S. PATENT DOCUMENTS

| | | | |
|---|---|---|---|
| 3,772,824 A * | 11/1973 | Terzian et al. | 446/429 |
| 4,010,346 A | 3/1977 | Cecil et al. | |
| 4,062,430 A | 12/1977 | Momberg | |
| 4,109,740 A | 8/1978 | Andruchiw | |
| 4,124,152 A * | 11/1978 | Fioravazzi | 222/604 |
| 4,175,224 A | 11/1979 | Sims et al. | |
| 4,328,412 A | 5/1982 | Watanabe et al. | |
| 4,371,107 A | 2/1983 | Watanabe et al. | |
| 4,573,665 A | 3/1986 | Strohl et al. | |
| 4,738,582 A | 4/1988 | Roberts | |
| 4,926,768 A | 5/1990 | Magda | |
| 5,029,891 A | 7/1991 | Jacobs | |
| 5,440,098 A | 8/1995 | Matus | |
| 5,653,305 A | 8/1997 | Duke | |
| 5,685,385 A | 11/1997 | Sanuga | |
| 5,695,212 A | 12/1997 | Hinkston | |
| 5,730,891 A | 3/1998 | Karpoff et al. | |
| 5,842,532 A * | 12/1998 | Fox et al. | 180/6.48 |
| 5,868,407 A | 2/1999 | Roese | |
| 6,129,166 A | 10/2000 | Sueshige et al. | |
| 6,237,662 B1 * | 5/2001 | Thomasberg | 152/510 |
| 6,620,022 B1 * | 9/2003 | Smith et al. | 446/454 |
| 6,909,068 B1 | 6/2005 | Alleman, Jr. et al. | |
| 7,114,732 B1 | 10/2006 | Ismail | |
| 2004/0182846 A1 * | 9/2004 | Silvestro | 219/133 |
| 2010/0084830 A1 * | 4/2010 | Biesse | 280/11.25 |

FOREIGN PATENT DOCUMENTS

| | | |
|---|---|---|
| DE | 1129639 | 5/1962 |
| DE | 6904941 U | 2/1969 |
| DE | 1632541 A1 | 4/1970 |
| DE | 7600016 U | 7/1976 |
| DE | 2621668 A1 | 12/1976 |
| DE | 2701122 A1 | 7/1978 |
| DE | 3007723 A1 | 9/1980 |
| DE | 8125730 U | 12/1981 |
| DE | 3527183 C1 | 12/1986 |
| DE | 8712625 U1 | 2/1988 |
| DE | 8802440 U1 | 7/1988 |
| DE | 3715047 A1 | 11/1988 |
| DE | 9001349 U1 | 7/1991 |
| DE | 4017118 A1 | 12/1991 |
| DE | 9416725 U1 | 2/1995 |
| DE | 9405593 U1 | 5/1995 |
| DE | 9404450 U1 | 8/1995 |
| DE | 29505920 U1 | 8/1995 |
| DE | 29600671 U1 | 8/1996 |
| DE | 29711059 U1 | 10/1997 |
| DE | 29912576 U1 | 2/2000 |
| DE | 19852372 A1 | 5/2000 |
| DE | 19933801 C2 | 1/2001 |
| EP | 320415 B1 | 5/1988 |
| EP | 0320415 A1 | 6/1989 |
| GB | 102314 | 11/1916 |
| GB | 414852 A | 8/1934 |
| GB | 475435 A | 11/1937 |
| GB | 581631 A | 10/1946 |
| GB | 1071715 A | 6/1967 |
| GB | 1480102 A | 7/1977 |
| JP | 4526413 | 10/1970 |
| JP | 5143162 U | 10/1977 |
| JP | 3130992 U | 12/1991 |
| JP | 9202238 | 8/1997 |
| JP | 11227610 | 8/1999 |

OTHER PUBLICATIONS

Cover of Lincoln Operating Manual and Parts List No. IM-218 (published in 1957) and entitled: "Shield-Arc" 200, 300, and 400 Ampere DC Motor Driven DC Welder.

Cover of Lincoln Welders Operating Manual No. IM-229-A (published in Jun. 1983) and entitled: "Shield-Arc" SAE DC Arc Welding Power Sources Motor and Belt Driven.

Page 4 (8-81) of Miller Gold Star SS Series Brochure, Index No. DC/8.0 and entitled: "Constant Current DC Welding Power Sources".

Page 1 of Owner's Manual for No. 4 Running Gear 040 019 and No. 4A Running Gear 040.020 (published in Aug. 1991), Form: OM-644E.

Page 1 of Owner's Manual for Running Gear No. 18, 19, & 20 and Cylinder Racks 3CR, 4CR & 5CR (published in Jun. 1995), Form: OM-661F.

Page 2 of Owner's Manual for No. 4B Running Gear (published in Nov. 2005), Form: OM-689.

Photo of a prior art welder and running gear.

\* cited by examiner

ENGINE DRIVEN WELDER AND RUNNING GEAR

CROSS-REFERENCE TO RELATED APPLICATIONS

This utility patent application claims the benefit of and priority to U.S. provisional application 61/122,996, filed Dec. 16, 2008, entitled CART FOR A WELDER; WELDER/CART COMBINATION, which is herein expressly incorporated by reference in its entirety, for all purposes.

BACKGROUND OF THE INVENTION

1. Field of the Invention

The present invention relates to engine driven welders and, more specifically, to engine driven welders having running gears to facilitate movement of such engine driven welders.

2. Discussion of the Related Art

A need to move welding equipment has been long recognized. Various running gears have been provided for suitably moving welding equipment around in a welding shop or other fabricating facility. Such facilities usually have substantially flat floor surfaces, whereby caster-like wheels have been successfully implemented into running gears for rolling the welding equipment across these flat floor surfaces.

At times, needs arise to transport welding equipment to jobsites, that is, away from the fabricating facilities which are purposefully set up for such welding-related tasks. In such instances, engine driven welders are often used because they are stand-alone welding machines that generate their own electrical current and therefore do not have to be plugged into a power source or outlet. Correspondingly, such engine driven welders, with their stand-alone capabilities can be moved to a jobsite.

Engine driven welders can be quite large and heavy, whereby they are at times installed upon a vehicle such as a work truck that is driven to the jobsite. Once the work truck is driven to the job site, the engine driven welder is often left mounted to the work truck and long weld cables are routed to a particular work piece to conduct a welding current, generated by the engine driven welder, to the work piece. Such long weld cables can be heavy and expensive.

Accordingly, efforts have been successfully made to improve engine driven welder technology so that smaller and lighter units had high enough welding performance output capability to make such engine driven welders portable, not only to the jobsites on work trucks, but also at least somewhat portable at the jobsites themselves. This allowed users to manually push or otherwise move the engine driven welders closer to the particular work pieces being welded, allowing the users to implement shorter weld cables which may reduce welder performance losses that can exist as a function of weld cable length (for the same weld cable diameter).

Attempts have been made to enhance portability of such engines driven welders by making them easier for the users to maneuver. For example, it is known to mount an engine driven welder to a cart or undercarriage that has suspension components and/or a steerable axle. Another known cart or undercarriage includes a closely spaced pair of wheels, with smaller wheels being provided toward a front of the undercarriage's base. An elongate push bar is connected to the base of the undercarriage and is located opposite the smaller front wheels in a manner that allows a user to lift the smaller front wheels by pushing down on the elongate push bar. Such carts or undercarriages have proven largely successful at increasing manual portability of engine driven welders.

Notwithstanding, devices that further improve manual portability of engine driven welders could prove desirable.

SUMMARY AND OBJECTS OF THE INVENTION

In light of the foregoing, a portable engine driven welder is provided that has a case enclosing an internal combustion engine and a welding generator, and a running gear that is attached to the case. The running gear includes a pair of rails and a pair of leading wheels connected to the rails toward the back wall of the case. A pair of trailing wheels is connected to the rails toward the front wall of the case. The leading and trailing wheels have different resiliencies, with the leading wheels being more resilient than the trailing wheels. This allows the leading wheels to act like a suspension system for the portable engine driven welder and running gear by soaking up or absorbing impacts instead of transmitting them therethrough so as to reduce exposure of the portable engine driven welder to such impacts, and making it easier for a user to push across uneven terrain.

In some aspects, the leading wheels are larger, for example, having larger diameters, than trailing wheels. The leading and trailing wheels can have central wheel segments with tires mounted thereto, and the tires on the leading wheels can have taller sidewalls heights. Some implementations have pneumatic tires and, in these implementations, the tires on the leading wheels can be inflated to a lower operating pressure or lower PSI (pounds per square inch) than the tires on the trailing wheels. Larger tire diameters, larger tires widths, taller sidewall heights, particular sidewall thickness dimensions, lower operating pressures, and/or other factors can contribute to the leading wheels having greater resiliency values than the trailing wheels.

According to yet other aspects, larger diameter leading wheels can help the leading wheels roll over obstacles instead of having to be lifted up and over. Such configuration reduces the amount of times that, or reduces the extent to which, an operator has to push down on the engine driven welder in order to lift the leading wheels upwardly to climb over obstacles. The larger leading wheels may climb up at least some such obstacles by merely rolling over them.

In some aspects, the leading wheels have larger footprints or contact patches defined between them and the underlying ground surface than do the trailing wheels. The smaller contact patches of the trailing wheels may, in some instances, improve maneuverability of the engine driven welder by allowing a user to laterally or transversely skid the trailing wheels across the underlying ground surface in order to (re)point the engine driven welder in a desired travel direction.

According to yet other aspects, the rails can include front tapering segments that extend upward and angularly, tangentially or otherwise, in front of the leading wheels. Such front tapering segments may protect the leading wheels from impacting certain relatively tall obstructions. The front tapering segments may further provide skid or ramp-like structures than allow users to slide the engine driven welder up tall obstacles before the leading wheels can engage and roll over such obstacles. The front tapering segments may cooperate with the leading wheels, such that obstacles that would otherwise be contacted at or near a front axle height of the leading wheels, which would be difficult for the wheels to roll over, can be at least partially slid up, pushed up, glanced up, or skidded up, by way of the front tapering segments, so that such obstacle then contacts a lower portion of the leading wheels. This can make the obstacle easier to roll or climb over, at that point, by contacting portions of the leading wheels that are spaced further below their axis of rotation, which makes rotating the leading wheels easier.

The engine driven welder may also be provided with a running gear that has relatively few moving parts requiring maintenance. The engine driven welder and running gear may also be substantially devoid of structure(s) extending outwardly beyond a perimeter of the engine driven welder that would otherwise occupy space at a jobsite in an area around the engine driven welder.

Other various features and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

DETAILED DESCRIPTION OF THE INVENTION

Figure 1:
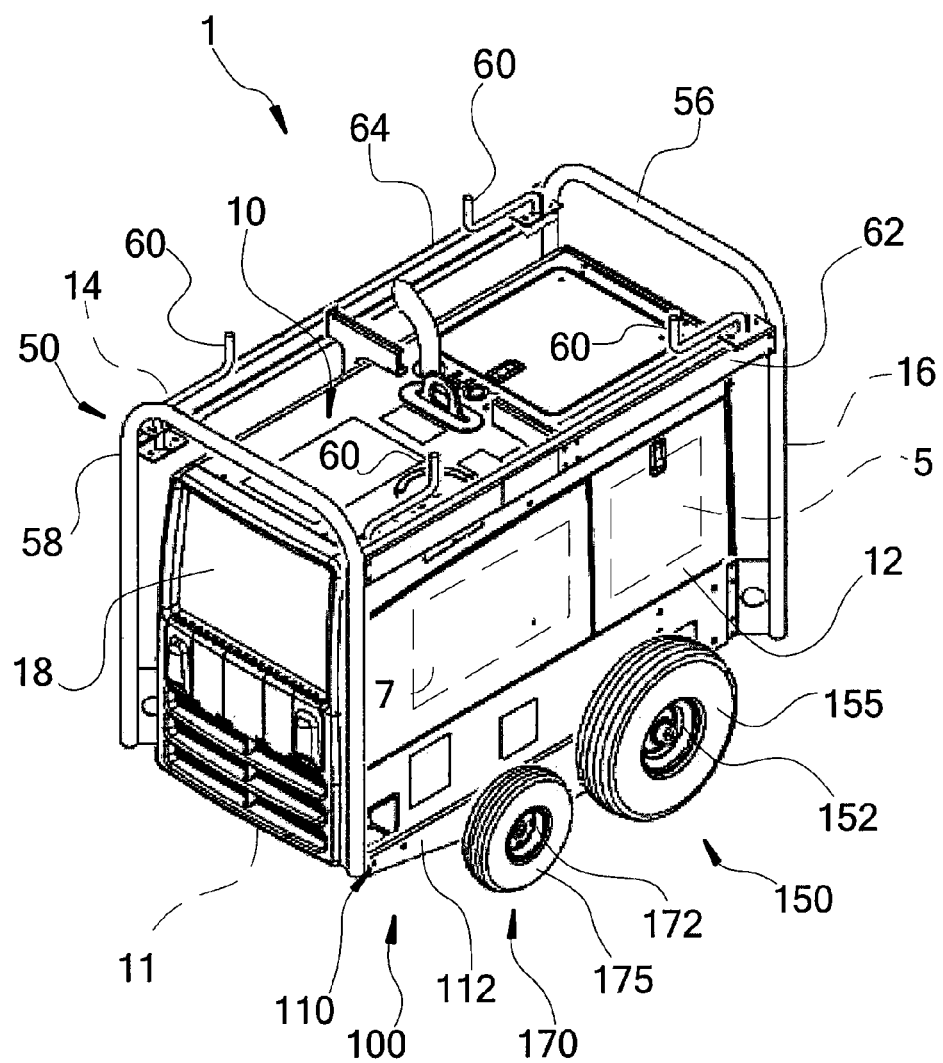
FIG. 1 is a pictorial view of an engine driven welder and running gear of the present invention.
Figure 2:
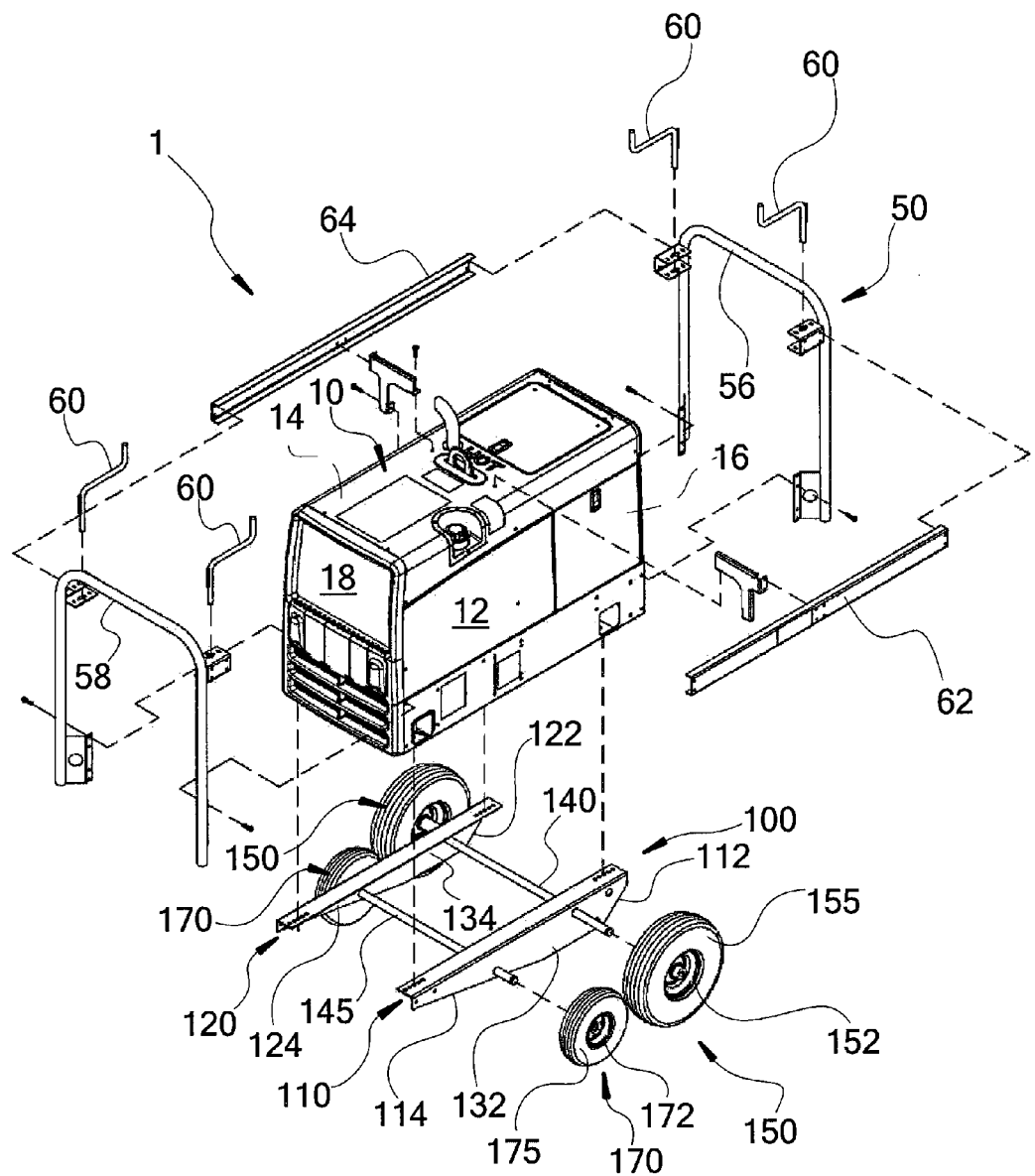
FIG. 2 is an exploded, pictorial, view of engine driven welder and running gear of FIG. 1.

FIGS. 1 and 2 show portable engine driven welders, e.g., welders 1, each including a protective cage 50 and a running gear 100. The welder 1 includes an internal combustion engine and a welding generator 7 that are housed within a case 10. A suitable such welder 1 can include any of the Bobcat™, Legend®, and Trailblazer® Series from the Miller Electric Manufacturing Company, in Appleton, Wis. The case 10 includes a bottom wall 11, a pair of sidewalls 12, 14 that extend upwardly from side edges of the bottom wall 11. A back wall 16 extends between and interconnects the sidewalls 12, 14 at a back end of the case. A front wall 18 extends between and interconnects the sidewalls 12, 14 at a front end of the case. Front wall 18 houses the controls for the welder 1 and typically faces away from a direction of travel, so that they are less susceptible to impact-induced damage than they would be if they faced toward the travel direction.

Still referring to FIGS. 1 and 2, protective cage 50 is connected directly to the case 10 and includes back and front handles 56 and 58 that overlie outer perimeters of the back and front walls 16 and 18, respectively. Crossbars 62 and 64 extend between the back and front handles 56 and 58, connecting the back and front handle 56, 58 to each other, and above the sidewalls 12, 15. In some embodiments, the protective cage 50 further includes hooks 60 for hanging or otherwise storing, for example, weld cables and/or other welding accessories. It is noted that the protective cage 50 need not cover the entire welder 1, as illustrated. Instead, in some embodiments, a single handle 58 is provided, without the other handle 56 or crossbars 62, 64.

Running gear 100 supports the welder 1 and its optional protective cage 50, while facilitating movement of the welder 1 over uneven terrain, for example, in some embodiments, rolling up and over various obstacles. Running gear 100 includes a pair of rails 110, 120 and two pairs of wheels, namely, a pair of leading wheels 150 and a pair of trailing wheels 170.

Each rail 110, 120 includes a horizontal leg that attaches to outer segments of the bottom wall 11 and an upright leg that extends perpendicularly down from an outer edge of the horizontal leg, whereby the rails 110, 120 define an L-shaped profile when viewed from a front or rear elevation.

Figure 3:
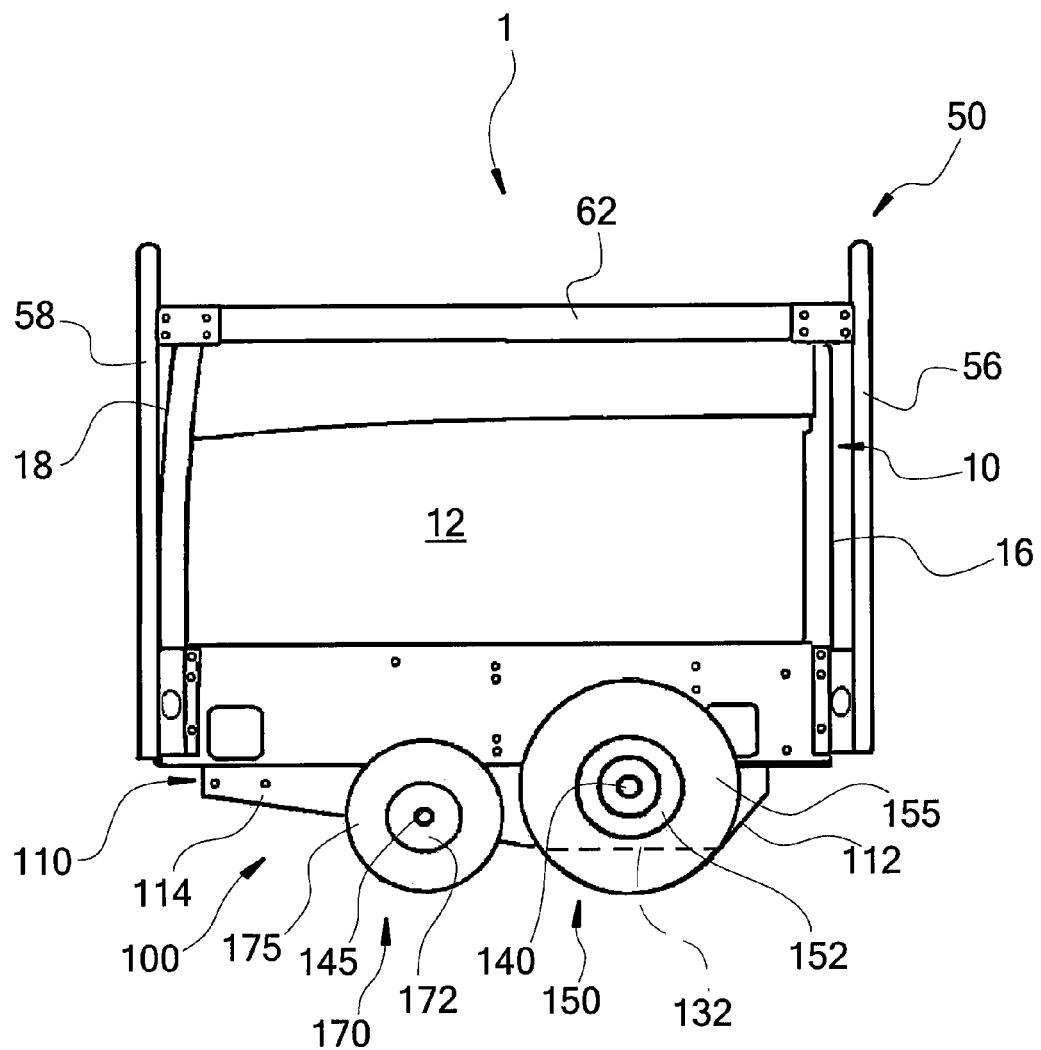
FIG. 3 is a side elevation view of a variant of the engine driven welder and running gear of FIG. 1.

Referring now to FIGS. 1-3, a length of the rails 110, 120 is less than a length of the case. The rails 110, 120 can be longitudinally centered under the case 10 so that the ends of the case 10 project beyond the corresponding ends of the rails 110, 120. Perhaps best seen in the exploded view of FIG. 2, each of the rails 110, 120 includes a front tapering segment 112, 122 that extends angularly from a bottom edge of the rail 110, 120 toward the back wall 16 of the case 10. At the other end of the rail 110, 120, a rear tapering segment 114, 124 extends angularly from the bottom edge of the rail 110, 120 toward the front wall 18 of the case 10.

The rear tapering segment 114, 124 can be longer than the front tapering segment 112, 122, whereby the rear tapering segment 114, 124 may extend across more of the rail 110, 120 than the front tapering segment 112, 122. For example, the rear tapering segment 114, 124 extends more than half-way along the length of the rail 110, 120, from the back toward the front. In contrast, the front tapering segment 112, 122 extends less than half-way along the length of the rail 110, 120, from the front toward the back. As for the relative lengths of the rear tapering segment 114, 124 as compared to those of the front tapering segment 112, 122, in some embodiments, the rear tapering segment 114, 124 can be at least two times longer, or at least five times longer, than the front tapering segment 112, 122.

Referring yet further to FIGS. 1-3, a maximum height segment 132, 134 may extend between the front and rear tapering segments 112, 122 and 114, 124. The maximum height segment 132, 134 has a bottom edge that is substantially parallel to the upper edge of the rail 110, 120 defined at the corner between the horizontal and upright legs of the rail 110, 120. In this regard, the maximum height segment 132, 134 can have a rectangular profile shape while the front and rear tapering segments 112, 122 and 114, 124 have angled or somewhat triangular profile shapes.

Referring now to FIG. 2, regardless of the particular configuration of the rails 110 and 120, they may serve as mounting structures for supporting axles such as leading axle 140 and trailing axle 145. Leading axle 140 is mounted toward the front tapering segments 112 and 122, extending through aligned bores in the rails 110 and 120, respectively. As seen in FIG. 2, the leading axle 140 can be located within the maximum height segments 132 and 134, adjacent the front tapering segments 112 and 122, while also being located adjacent the top edge of the maximum height segments 132 and 134 or near the horizontal legs of the rails 110 and 120.

Referring still to FIG. 2, trailing axle 145 is mounted within the rear tapering segments 114, 124 extending through aligned bores in the rails 110 and 120, respectively. Trailing axle 145 can be located, longitudinally, in about the middle of the rear tapering segments 114 and 124, while being adjacent a lower edge of the rear tapering segments.

Referring now to FIGS. 2 and 3, a pair of leading wheels 150 is rotatably mounted to the leading axle 140, and a pair of trailing wheels 170 is mounted to the trailing axle 145. Regarding their particular placement along a length of the welder 1, leading wheels 150 are connected to the rails 110 and 120 at locations upon the rails that are closer to the back wall 16 of the case 10 than they are to the front wall 18. The leading wheels 150 can be positioned rather close to the back wall 16 of the case 10 so that the leading wheels 150 are longitudinally spaced from the back wall 16, or a plane projecting therefrom, by a distance that is less than a radius of the leading wheels. The trailing wheels 170 are connected to the rails 110 and 120 at locations upon the rails that are closer to the front wall 118 of the case 10 than they are to the back wall 16.

Referring specifically to FIG. 3, the leading wheel 150 is positioned along the length of the rail 110 such that the front tapering segment 122 extends angularly in front of the leading wheel 150. When viewed from a side elevation, the bottom edge of front tapering segment 122 extends from, or appears to intersect, a lower portion of the leading wheel 150, for example, a lower ½, a lower ⅓, or a lower ⅕ of the leading wheel 150. The leading wheel 150 can also extend entirely across the maximum height segments 130 of rail 110, extending from the intersection with the front tapering segment 122, and extends partway across a front-most portion of the rear tapering segment 124. In this configuration, the front and rear tapering segments 122 and 124 emerge from behind the leading wheel 150 at different heights, with the rear tapering segment 124 emerging from higher up on the leading wheel 150. It is, of course, understood that although such placement is discussed only in terms of the right side or the rail 110 side of the welder 1 and running gear 100, the same is equally applicable to the other side, that is, the left side or rail 120 side of welder 1 and running gear 100.

Referring again to FIGS. 1-3, leading wheels 150 are larger in diameter than the trailing wheels 170. For example, outside diameters of the leading and trailing wheels 150 and 170 can be about 14.5 inches and 10.25 inches, respectively, although it is noted that other diameters are contemplated in which the leading wheels 150 are, preferably, larger than the trailing wheels 170.

The leading and trailing wheels 150 and 170 may be adapted to at least partially provide desired handling and/or other performance characteristics to the running gear 100 while moving welder 1. For example, the leading wheels 150 can have greater resiliencies than the trailing wheels 170. In this regard, leading wheels 150 can be softer or more pliable and therefore more easily compressible, deflectable, and/or otherwise deformable than the trailing wheels 170. Accordingly, a pliability differential may be defined between the leading and trailing wheels 150 and 170. This allows the front wheels 150 to perform suspension-like duties for the running gear 100 and welder 1 by resiliently isolating them from, or floating them over, discontinuous surface characteristics of the underlying terrain while moving across such terrain.

Still referring to FIGS. 1-3, the pliability differential between the leading and trailing wheels 150 and 170 can be suitably accomplished in any of a variety of ways. For example, in some embodiments, the leading and trailing wheels 150 and 170 include central wheel segments 152 and 172, respectively, and tires 155 and 175 are mounted to the central wheel segments 152 and 172. The pliability differential between the leading and trailing wheels 150 and 170 can be achieved by adapting the tires 155 and 175, accordingly.

In some embodiments, the tires 155 and 175 can be solid tires, that is, being a solid web of material that radiates outwardly from the central wheel segments 152 and 172 or otherwise having substantially no void space within their interiors. For such solid tire versions, tires 155 of leading wheels 150 can be either made from a more pliable material tires 175 of trailing wheels 170, or can have a thicker radial cross-section (greater diameter) of the same material as trailing wheel tires 172, such that the additional material provides more overall compressive capability to the leading wheels 150.

As another example, the tires 155 and 175 can be pneumatic or gas filled instead of solid. In these versions, the pliability differential may be established by filling the leading tires 155 to a lower operating pressure than the trailing tires 175 and/or configuring the leading tires 155 to provide greater pliability than their trailing tire 175 counterparts. In other words, leading tires 155 can have thinner sidewalls transverse dimensions, thinner outer circumferential surfaces, and/or taller sidewall heights or taller sidewall profiles, when compared to those of trailing tires 175. Any of such characteristics may contribute to the leading tires 155 being more pliable than the trailing tires 175. For example, in some embodiments, leading tires 155 are rated for and filled to an operating pressure of about 38 PSI, while the trailing tires 175 are rated for a filled to an operating pressure of about 50 PSI. In these embodiments, the trailing tires 175 define operating pressures that are at least about 30% greater than, optionally at least about 25% greater than or 20% greater than, operating pressures of the leading tires 155. Referring further to FIGS. 1-3, the softer or more pliable leading wheels 150 will conform to and grip an underlying terrain or obstacle to a greater extent than the trailing wheels 170. Such leading wheel 150 grip superiority can be further enhanced by providing a larger footprint or contact patch than the trailing wheels 170, with a contact patch being defined as an interface area between the wheels 150, 170 and an underlying surface of the terrain. The larger contact patch of leading wheels 150 can be a function of the more pliable material characteristics of the leading wheels 150, whereby they conform and spread out over the terrain across a larger area. However, in preferred embodiments, the larger contact patch of leading wheels 150 is also a function of a larger geometric size of the leading wheels 150, for example, width and/or diameter, when compared to the trailing wheels 170.

While the invention has been shown and described with respect to particular embodiments, it is understood that alternatives and modifications are possible and are contemplated as being within the scope of the present invention. Many changes and modifications could be made to the invention without departing from the spirit thereof. The scope of these changes will become apparent from the appended claims.

What is claimed is:

1. A portable engine driven welder, comprising:
   a case enclosing an internal combustion engine and a welding generator therein, the case including,
      a bottom wall;
      a pair of sidewalls extending upwardly from side edges of the bottom wall;
      a back wall extending between and interconnecting the sidewalls at a back end of the case; and
      a front wall extending between and interconnecting the sidewalls at a front end of the case, the front wall of the case housing controls for the portable engine driven welder therein; and
   a running gear that facilitates movement of the portable engine driven welder by manual pushing, the running, gear comprising, a pair of rails connected to the bottom wall of the case and extending in a longitudinal direction with respect to the case and defining front tapering segment;

a pair of leading wheels defining a diameter thereof and being connected to the rails at a location that is outward of the ease and the pair of rails, the leading wheels arranged with respect to the rails so that the front tapering segments of the rails intersect lower portions of the leading wheels and extend angularly from the lower portions of the leading wheels toward the bottom wall of the case, wherein the front tapering segments of the rails and leading wheels are arranged with respect to each other for guiding obstacles encountered b the running gear to contact the lower portions of the leading wheels; and a pair of trailing wheels defining a diameter thereof that is smaller than the diameter of the leading wheels, the pair of trailing wheels being connected to the rails at a location that is outward of the case and the pair of rails.

2. The portable engine driven welder of claim 1, each of the rails having (i) a front tapering segment that extends angularly from the rail bottom edge toward the back wall of the case, and (ii) a rear tapering segment that extends angularly from the rail bottom edge toward the front wall of the case, and each of the rails further comprising a maximum height segment extending between the front and rear tapering segments, the maximum height segment extending downwardly from the case further than the front and rear tapering segments, and wherein the leading wheels are mounted to the rails at a location that is within the maximum height segment.

3. The portable engine driven welder of claim 2, wherein the leading wheels are mounted to the rails at a location that is closer to the front tapering segment than the rear tapering segment.

4. The portable engine driven welder of claim 1, wherein, as measured longitudinally along the rails, the rear tapering segments are at least two times longer than the front tapering segments.

5. The portable engine driven welder of claim 1, wherein, as measured longitudinally along the rails, the rear tapering segments are at least five times longer than the front tapering segments.

6. The portable engine driven welder of claim 1, wherein a length of the rails is less than a length of the case.

7. The portable engine driven welder of claim 6, wherein the rails are spaced from each of the front and back walls of the case, such that the case extends longitudinally beyond the front tapering segment of the rails in a first direction, and extends longitudinally beyond the rear tapering segment of the rails in a second, opposite, direction.

8. A running gear for use with a portable engine driven welder to allow a user to manually move the portable engine drive welder, wherein the portable engine driven welder has a case with opposing front and back walls, the running gear comprising:

a pair of rails connected to the case of the portable engine driven welder;

a pair of leading wheels connected to the rails nearer the back wall than the front wall of the case; and a pair of trailing wheels connected to the rails nearer the front wall than the back wall of the case, wherein axles extend axially from the leading and trailing wheels and connect the leading and trailing wheels to the rails and wherein the leading wheels are larger in diameter than the trailing wheels so as to accommodate transversely skidding the trailing wheels while aligning the engine driven welder in a desired travel direction, and wherein the leading wheels are arranged with respect to the rails so that the rails extend annularly from lower portions of the leading wheels, wherein the rails and leading wheels are arranged with respect to each other for guiding obstacles encountered by the running gear to contact the lower portions of the leading wheels.

9. The portable engine driven welder of claim 8, wherein, as measured longitudinally along the rails, the rear tapering segments are at least five times longer than the front tapering segments.

10. The portable engine driven welder of claim 8, wherein a length of the rails is less than a length of the case.

* * * * *